United States Patent Office 3,424,381
Patented Jan. 28, 1969

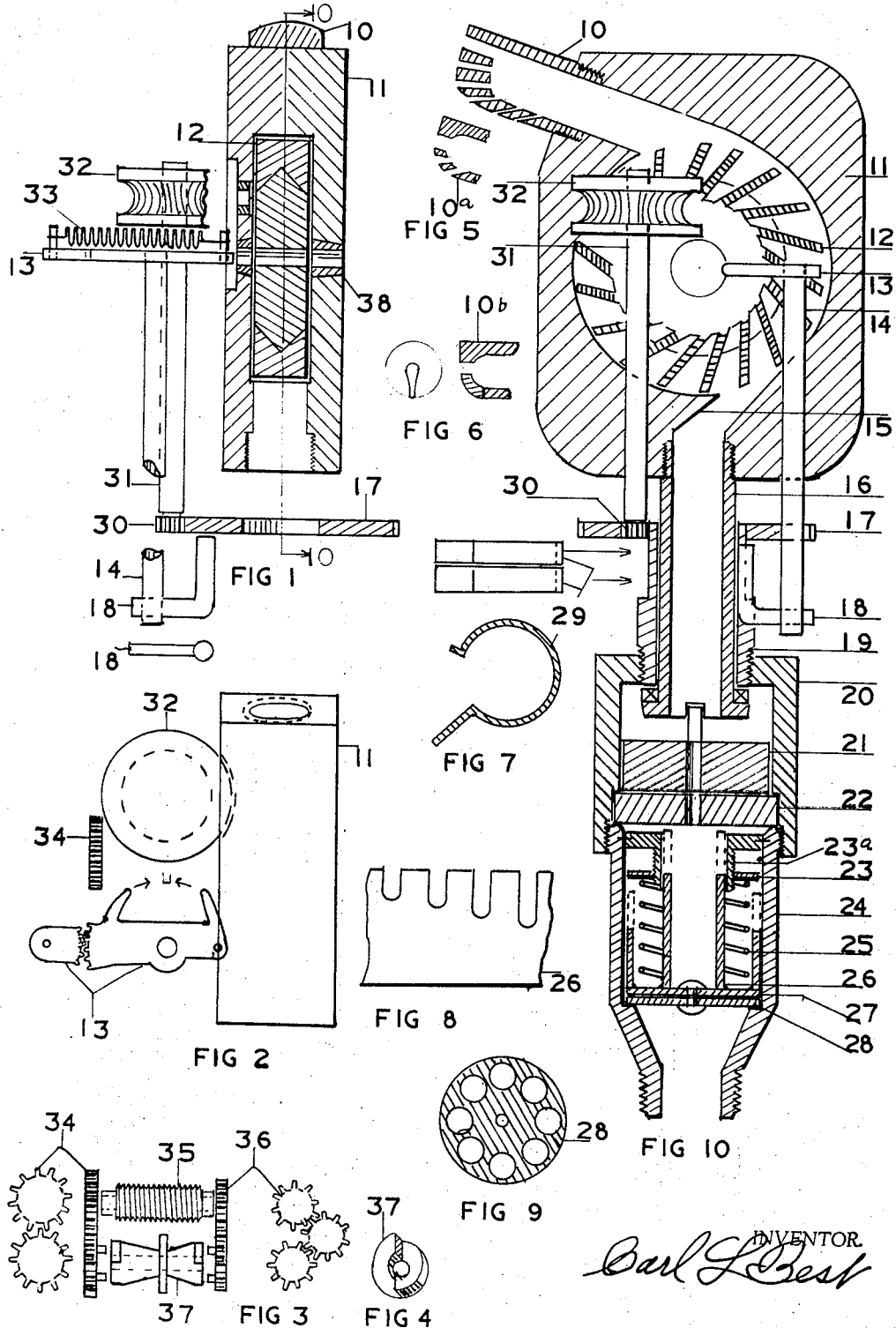

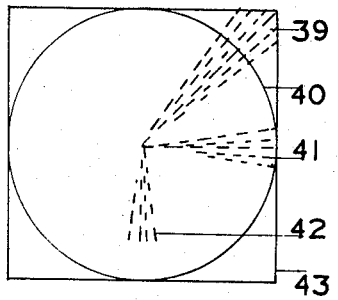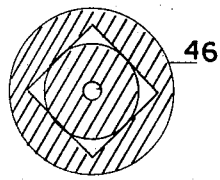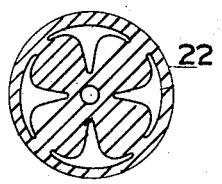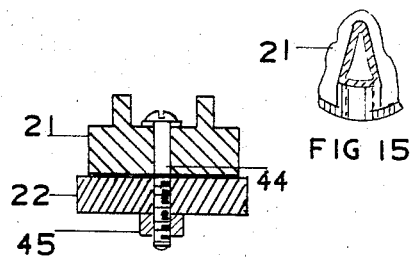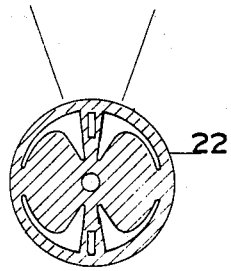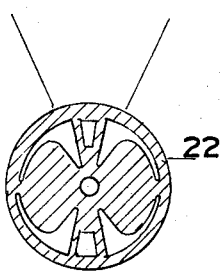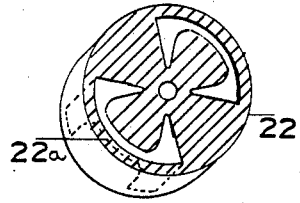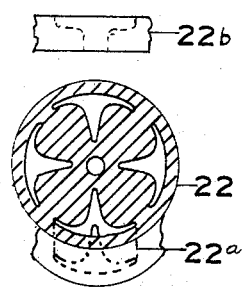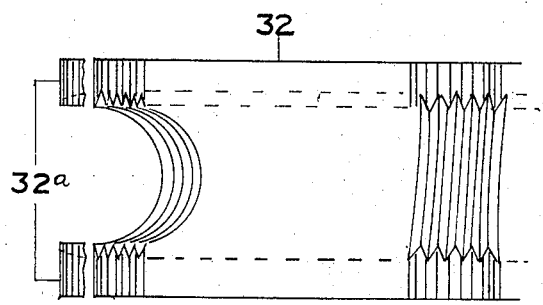

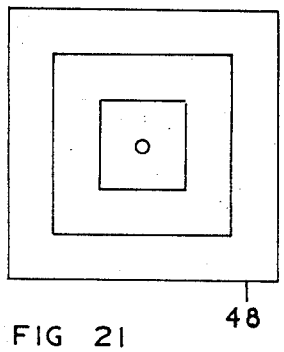
FIG 21   48
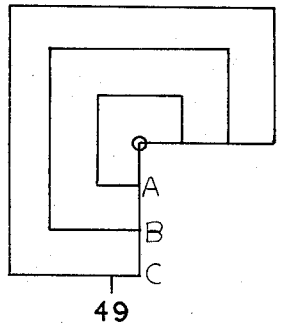
49   A B C
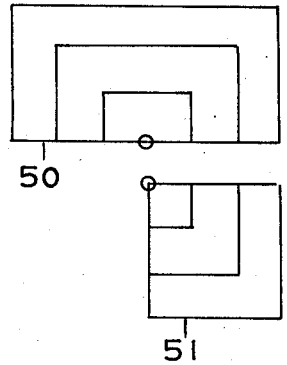
50   51
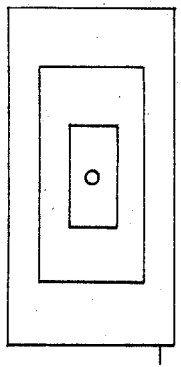
FIG 22   52
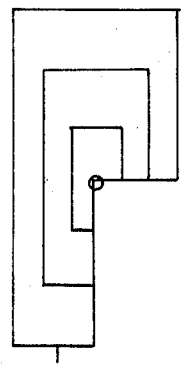
53
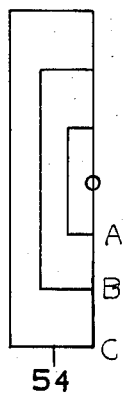
54   A B C
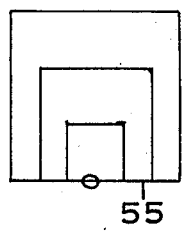
55
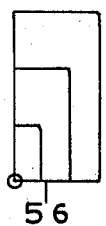
56
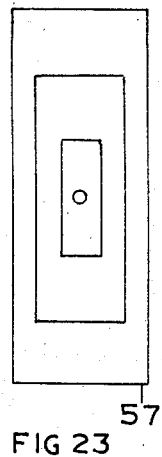
FIG 23   57
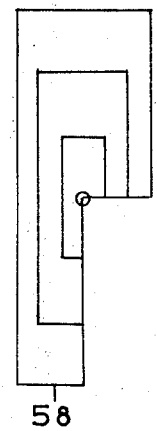
58
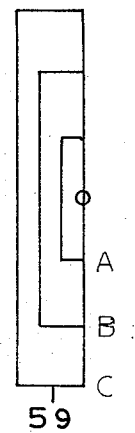
59   A B C
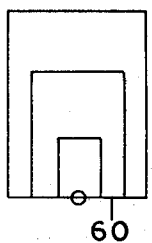
60
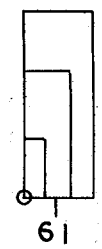
61

3,424,381
COMPLETE MULTIPURPOSE STRAIGHT LINE SPRINKLER
Carl L. Best, 4141 NW. 39th Ave.,
Fort Lauderdale, Fla. 33309
Filed Oct. 17, 1966, Ser. No. 587,195
U.S. Cl. 239—97       10 Claims
Int. Cl. B05b 3/04

ABSTRACT OF THE DISCLOSURE

A reversible rotary, water driven sprinkler, for forming linear, square or rectangular patterns having coacting pattern control elements in the water line; one of which elements is stationary and the second of which rotates with the sprinkler head.

Background of the invention

This invention relates to an improvement in low cost, easily installed yard sprinklers capable of producing a large variety of linear spray patterns, thus capable of sprinkling a large variety of areas. By use of the novel mechanism here disclosed, the excessive cost and labor of installation of the prior sprinkler systems may be reduced since a lesser number of sprinkler heads and less pipe is required.

Summary of the invention

Therefore, the objective of this invention is a complete multipurpose sprinkling unit which lends itself to large and small areas and many straight line water patterns.

Also, one which will throw a well controlled stream without side or back splashing, a uniform stream of water from itself, downward and out to end of stream.

A sprinkler which will produce a square, a true rectangle, and oblong water patterns of many various sizes and shapes of straight lines as against circle lines.

A sprinkler which will not be affected by a variation of water pressures.

These objectives, so a sprinkling system can be installed without digging trenches all thru a yard and reducing the number of sprinklers, so a do it yourself job can be installed, a section at a time by simply laying pipe around the house and burying later, if desired, at a cost of approximately ¼ present systems and about ½ such cost if trade installed.

Further as an individual sprinkler, the great variety of patterns makes possible coverage of most any straight line area.

These and other advantages will become apparent from the following description of preferred and varied modified forms thereof, reference being now made to the appended drawings in which—

Brief description of the drawing

FIG. 1 is a side view of 11 of FIG. 10, this is the turning power.
FIG. 2 is a top view.
FIG. 3 is the assembly of fixed worm and gears and sliding keyed clutch and free gears.
FIG. 4, enlarged view of both clutch ends.
FIG. 5, smaller type nozzle showing top opening is lower.
FIG. 6, graduated opening nozzle.
FIG. 7, clutch actuating one protrusion ring.
FIG. 8, flat layout of 26 tube showing opening.
FIG. 9, pressure valve opening adjustment plate.
FIG. 10, front view thru center line 10—10 of FIG. 1 at 11 and below this of complete sprinkler combination.
FIG. 11, view of a square yard section.
FIG. 12, a modified assembly of the two valve disks.
FIG. 13, one method of valve opening for a water-tight fit of bottom disk to housing seat.
FIG. 14, all valves with considerable leaks between disk and housing, either 22a or 22b.
FIG. 15, sectional view of extended high opening for material saving while also getting height for turbulence control.
FIG. 16 is a replica valve form based upon yard section at corners.
FIG. 17, carrying the required graduated valve opening to produce an oblong water pattern.
FIG. 18, same graduated principle to produce a square water pattern.
FIG. 19, same graduated valve opening to produce a rectangle water pattern.
FIG. 20, enlarged view of free flow type fine thread worm gear.
FIG. 21, square patterns possible at full turn and other patterns at part turns.
FIG. 22, rectangle at full turn and other patterns at part turn.
FIG. 23, oblong pattern at full turn and others at part turn.

Description of the preferred embodiments

Referring now specifically to the drawing of a complete multipurpose sprinkler FIG. 10 in general preferred form but subject to variations necessary to meet the peculiar variety of conditions encountered, starting with nozzle 10 showing openings from volume chamber, also note view 10a and FIG. 6 variations. This is a full down spray nozzle which produces a uniform curtain of water from itself to end of stream, it can have a main opening at top as shown at 10 or at center as at 10a as required to reduce total open area when needed to control distance and in size change to a smaller member for a smaller sprinkling unit, openings properly spaced and spaced from each other in variations as required in different sizes or a lessor number of openings as per FIG. 6 with proper size and graduated slot to suit the down spray volume desired with the different capacity nozzles as required by the different water pressures as this is a variable as a single hole nozzle spraying varies with different pressures, the nozzle shown does produce a down spray curtain of water its full length with no side spray so it can be used near buildings which is one of the requirements to meet the objective outlined.

A sprinkler turning power which will not splatter water all around itself to it can be used near buildings with before described nozzle, item 11 FIG. 10 is an open front view of line 10—10 FIG. 1 but with 32 and 13 and 31 and 14 superimposed to show their locations, this water wheel power as can be noted, required a different treatment to make it practical for this application as note the lower opening at the bottom is center located for practical turning location and also so gearing and reversing members were in practical working location and this was not favorable to water wheel power, but was remedied by the starting flow direction at 15 plus space between outer edge of wheel 12 and its housing at 12 as against the close fit on opposite below nozzle which should just permit free turning, the proper variation of space at 12 will give the required power in conjunction with water volume desired at nozzle, this space at 12 is all important in that balancing of needed power as against nozzle volume desired because as you favor one, you take from the other and also as nozzle open area is changed it affects this balance, but this size wheel is sufficient to operate a ¾" pipe fitting size sprinkler for the range of from open nozzle area of .01227 which is equivalent of a ⅛" round hole to more than is usually used in this size sprinkler, this in spite of the fact that the same water pressure exists at opposite side below nozzle so the wheel construction in conjunction with starting flow and space at 12 combined to overcome this and other unfavorable factors; note more wheel detail in FIG. 1.

Shaft thru 12 wheel center extends from front of 10—10 FIG. 1 and carries clutch 37 FIG. 3 which 37 is free to slide via loose key, 37 at both ends has a suitable recess to engage free idling gears as FIG. 4, which gears have protrusions to engage with 37, or any male to female means, as can be noted by 34 and 36 gears this will change direction to upper gears which are in engagement with clutch gears, 35 worm and its gears are fast to their shaft, 35 thread worm engaging 32 a thread worm gear by ½ or more of said worms circumference (as will be clarified later), this 32 fast to shaft 31 with a pinion 30 at its lower end which engages large gear 17 which gear is fast to stationary long nut 19 so it can be seen as 30 turns on fixed 17 this will move 11 around.

Item 13 FIG. 10 (also in FIG. 1 and FIG. 2) is a double snap clutch throw means which is acted upon by its lower member 18 which comes in contact with a one protrusion reversing adjustment ring 29 FIG. 7 which single protrusion as against two now being used, permits a full turn as against about ¾ turn with two protrusions, removing adjustment rings or constructing 18 to slide clear of protrusions, will make possible steady turning instead of being only reversible, arrows show location of two rings 29 on 19. Snap means 13 will be free to move to point of snap before its fingers FIG. 2 engages center extension on 37 and double snap will have sufficient power to disengage gear and throw into opposite gear. Also, see FIG. 1 for spring 33, also note 13, FIG. 2 double members, engagement parts. Thread worm gear 32 helped to reduce without extended gear train with less load for limited power available to move, nylon was used for gear but delron might be better, if threads in this form are not practical for casting, then blank can be and threads can be cut in less than 30 seconds making a low cost reduction of 100 to 1 in about 1" diameter and with its ½ or plus circle engagement with worm, a very free, in fact a floating fit was possible having therefore a very limited load effect on the limited power available. Enlarged view of this gear FIG. 20, 32a is extension so more than ½ of worm can be mated for real free floating operation. Worm for this was a standard ¼–28 bolt but an acme type or regular worm thread should be considered.

A complete sprinkler to produce a square, a rectangle, an oblong or in general a straight line ground water pattern to meet the objectives requirements is shown FIG. 10, item 21 as a top disk and 22 as a bottom, these in a suitable housing 20 with connection means to other housing members, 21 is free to turn and being turned by female lower part of pivot and water pipe 16 engaging male on top part of 21, 22 is at water tight or near fit to housing therefore stationary, 21 is free turning pivot connected at a fixed and predetermined looseness with 22, both having matched openings, as 21 turns, a proper ratio for straight line or corner filling is produced out and around a circle pattern produced by leakage by the loose fit between 21 and 22 or combined with any housing leak with 22, leakage volume dictate the exact opening graduations on plates.

To clarify the graduated openings required for this performance you are referred to FIG. 11 which represents a square yard section with 64-foot sides (FIG. 11 is roughly ⅟₃₂ of inch to one foot). The 64-foot sides are then approximately 46-foot center to a corner so we must start with a sprinkler with top throw capacity of this 46 foot with average water pressure and a favorable nozzle elevation, this would require what in the trade is described as a ¾ inch pipe fitting size and is of general size as FIG. 10. Starting with a fixed center hole thru a hole a hollow pivot shaft sufficient to supply circle 40 and say a ³⁄₁₆ hole would do this, then the valve must provide the added opening in proper graduation for the corner area, now let's say center ³⁄₁₆ hole would make a stream if held stationary as at 41 and corner requirement at 39 to be supplied by valve, now it is obvious that a set of valves as at FIG. 16 would produce as required at corners and it does in proper graduation with a water tight valve and held stationary or, being water tight, moved slow by hand, or other power, but this does not make a working valve because first, a water tight valve could not be turned by the limited power available, second because with center hole supplying round area 41 and 40, as valve opens for corner it takes from center hole so its coverage drops as at 42 and thereby throwing out of balance the coverage, therefore requiring a much greater need to supply corner from 42 as against from 41 this, of course, could be supplied by increasing the size of members in FIG. 16 so much larger opening areas of the same design could be provided but this increased size is not desirable, also another loss at corner, is a greater spray by pressure increase at nozzle as corner supply is added to center supply, this also reduces the stream distance.

To overcome these factors, the larger graduated openings at FIG. 18 were developed, in this 22 is the bottom and 21 is the top disk, and as can be seen, they provide upward of 3 times the open area of FIG. 16 and within the same size disks and in proper relation, the too tight to move water tight valve was remedied by eliminating center hole to a loose connection between the disks to a calculated and fixed controlled leakage to supply area 40 in place of center hole and this made a very free turning combination so the limited power available could turn the sprinkler, the principle permits of various changes such as FIG. 19 will produce a rectangle and FIG. 17 an oblong and this 17 can be varied from that shown to obtain other water coverage measurements of any range between and outside of FIG. 19 and FIG. 18.

Another factor interfered which caused distance loss as when turning as against stationary, a turbulence develops by the constant open and closing which turbulence reduced the distance of stream from that it obtained when held at one point, so we will use the word baffle to describe a means to cure this turbulence, it was found a sort of roof over openings on 21 would baffle and reduce this turbulence, but increasing the height of wall of these openings also reduced turbulence and seemed the most practical, either solid height as at FIG. 12 or as at FIG. 15 with body thin and walls up to lengthen opening, FIG. 12 with 44 threaded pin into threaded 22 and nut 45 to lock this at a fixed space from 21 as one method as a pivot to hold these disks with required leakage. FIG. 13 and 14 show variations in openings possible. FIG. 13 at 22a with connecting channel which can be wider when two channels are used as against when four are used; FIG. 14 at 22b and 22a as optional but always the proper graduation and size must be maintained.

All corner extensions, as 22 on FIGS. 18-17-19-14 can be channel connected as at 22a FIG. 13 with a water tight fit between 22 and housing seat, and corresponding closer setting of 21 and 22 to each other.

Refer now to FIG. 10 for controlling line pressure variations and to adjust between two or more sprinklers on same line when there is a difference in requirements, item 24 is the housing, 27 the pressure head slideable in 24, 23a is a valve opening member for 26 a valve tube which tube slides into 23a opening and with graduated opening in tube as in FIG. 8 open view, 25 is a spring holding against 27 and adjustable by ring 23, FIG. 9 is face of 27 head and 28 and 28 is the adjustment plate which as can be seen can be set to reduce opening in 27 pressure head to adjust for different requirements between two or more sprinklers and also general reduction of volume, spring adjusted to hold at a set minimum pressure and giving at increased pressure forces valve tube 26 to move more into valve opening member 23a, thereby reducing opening in tube and holding water volume to sprinkler against the increased pressure.

To show the vast range of straight line water patterns just two standard sprinkler units with the square, rectangle and oblong valves can produce, note FIG. 21 item 49 at A-B-C, item 48 shows the square pattern starting at C as the top range of a 64' square with approximately 46' center to corner therefore requiring a sprinkler with a 46' capacity which would be what is called a ¾″ pipe fitting sprinkler as FIG. 10 with proper size pipe line and pressure this would be more than a 46' capacity, but let's consider 46' as a norm, this sprinkler would cover from B to C or more and a ½″ pipe fitting sprinkler would cover from B to A and less, so we have a choice of up to 64' x 64' and more, down to 20' x 20' with low nozzle at a full turn, 49 shows this at a ¾ turn, 50 at ½ turn, 51 at ¼ turn with a top of 32' x 32' down to 10' x 10' and these patterns can be swung around the sprinkler as a pivot point so water patterns can be placed to any direction around a house.

FIG. 22 shows the rectangle at 52 which will produce a pattern of a top of 40' x 80' and more, down to 20' x 40' and anything in between at a full turn, 53 shows a ¾ turn with same dimensions on two sides at at 52 but with a blank ¼ space, these ¾ turns are for corner of building, 54 and 55 are both possible at ½ turn with this rectangle whereas the square can only produce one pattern as at 50 at ½ turn, so with this you get at 54, a full length 80' x 20', down to 10' x 40' and at 55, a full ½ square of 52, 40' x 40', down to 10' x 10' square, item 56 at ¼ turn 20' x 40' down to 10' x 20'.

FIG. 23 oblong item 57, 32' x 88' or more, down to 10' x 56', at full turn, this also produces 2 patterns at the ½ turn, items 59 and 60, items 59—16' x 88' and down, item 60—32' x 44' and down, item 61—¼ turn 16' x 44' and down.

Minimum and maximums are approximates and depend upon nozzle elevation and water pressures.

I claim:

1. A straight line pattern sprinkler comprising a water supply pipe means having a first longitudinal axis, a sprinkler head rotatively supported by said pipe means for rotation about the said first longitudinal axis, a downwardly directed nozzle secured to the sprinkler head, a non-splashing water driven turbine mounted within said sprinkler head for rotation about a second axis transverse to said first axis and adapted to be rotatably driven by water passing through said pipe to said sprinkler head, gear means connecting a fixed portion of said pipe and said turbine for rotating said sprinkler head about said pipe, first and second coacting, valve discs located within said pipe and vertically positioned one with respect to the other, the first of said discs being fixed to the interior of the pipe in sealed relation therewith, and second of said discs being loosely positioned with respect to the pipe above said first disc and rotatably driven by means secured to the rotating sprinkler head, each said first and second discs having coacting openings such as to produce linear spray patterns on rotation of the spray head in use of the device, there being a predetermined clearance between the two discs the upper disk constantly turning opens and closes the graduated openings in the lower disk which openings thereby produce a gradual increase and decrease of added water over and around a circle water pattern, which circle pattern is produced by means of predetermined and fixed leakage through a set looseness between the two valve disks value, the increase and decrease adds the required water in proper graduated volume to change the circle pattern into straight line square, rectangle and oblong patterns according to the location positions of openings construed in the disks, a main line pressure control comprising a pressure head slidable in a suitable housing with supply openings— these balanced with enough face to stand against a certain determined water pressure with the help of a compression spring and to give in face of greater pressure and thereby moving head towards a valve ring with a round opening, a valve tube with graduated opening fast to head and fitted into said round opening, and as said head and tube is moved into said opening the graduated opening in said tube is reduced thereby controlling the increased water pressure, a pressure setting plate adjustable to the face of the head whereby a possible different requirement between two and more sprinklers on the same main waterline can be set and adjusted to.

2. A sprinkler nozzle according to claim 1 with a suitable housing for connection to a sprinkler and to provide a reservoir for the supply of water to a graduated opening directed down and out from itself whereby a uniform curtain of water from itself to the end of stream is produced.

3. A sprinkler nozzle according to claim 1 with a suitable housing for connecting to a sprinkler and to provide a reservoir for the supply of water to a plurality of openings, graduated and degreed and in variation to each other as required by the varied conditions encountered in the peculiarity of water action differences as in size changes and as in pressure changes whereby a downward and outward water curtain is produced.

4. A nozzle connectable to a sprinkler according to claim 1, with a water supply chamber to a varied and graduated opening having an increasingly thinner wall from its front to the back in line with the varied and graduated opening which helps increase spraying and spreading of water stream.

5. A none splashing power in a sprinkler to turn the sprinkler according to claim 1 comprising of a suitable housing with recess for a water wheel, said wheel with means to also receive water drive from sides as well as at outer circumference, a special water flow direction channel, said wheel actuated in said channel, said wheel fast to a shaft which extends out on one side of housing, on the extended shaft, a special clutch, keyed to slide and on each end a free gear with protrusions to engage said clutch, said gears in constant engagement with gears on another shaft and fast thereon and a fine thread worm also fast and said worm engaged to a special designed worm gear which transfers its greatly reduced movement through a pinion which pinion travels around a stationary large gear fixed to a stationary nut bearing for a water pipe extending from wheel housing thereby turning said housing, this is reversible when clutch is disengaged and put into engagement with the opposite gear this change by means of a pivot connected arm exposed to a set of two rings adjustable around nut bearing said rings having an extended finger which engage arm as said arm turns with housing, a snap clutch throw connected to said arm comprising a member with fingers on side towards clutch which fingers snap on an extension of said clutch, a second member engageable to said finger member each having a pin and across which and fast to pins is a pull spring and both members on their respective pivot means and engaged to each other by gear type segments means form a double strength snap for power required to pull clutch out of engagement and into the opposite gear.

6. The none splashing power in a sprinkler according to claim 5 in which the worm gear encircles the worm by at least one half of the worm's circumference thereby permitting a fine thread large reduction and a free spinning floating fit required by the limited power available.

7. The none splashing power in a sprinkler according to claim 5 wherein a flow channel direction favorable for wheel power and channel space balanced and adapted to meet the need of power and nozzle volume.

8. A straight line water pattern valve in a sprinkler according to claim 1 comprising of two cooperating disks with graduated type openings and means to pivot connect the upper disk to the lower disk at a predetermined and fixed distance to each other, the upper disk with male protrusions adapted for engagement with a turning member, the lower disk fixed stationary in a housing, the openings at 90 degrees to each other, this produces a square water pattern, the openings at 53 degrees to each other, but the top disk with just two straight in line openings, this produces a rectangle water pattern, the openings at any degree other than 90 degrees and 53 degrees to each other but the top disk with two straight in line openings, these will produce any variety of oblong water patterns.

9. A straight line water pattern valve in a sprinkler according to claim 1 comprising of two cooperating disks with means for pivot connecting said disks at a predetermined and fixed distance to each other, the bottom disk having the largest part of opening directed to a corner, the opening extending on both sides with a graduated and diminishing opening stopping short of meeting the end of other opening, the top a tapered type opening wider at its outer part which part to slightly over span the space between the ends of openings in the other disk, the upper disk is adapted to curtail turbulence by baffle means and with connecting means to receive turning movement.

10. A pressure control in a sprinkler according to claim 1 comprising of a suitable housing, a pressure head slideable in said housing, a plate adjustable to said pressure head, a spring against said pressure head, a spring adjustment ring, a fixed valve opening, a valve tube fast to pressure head, said valve tube with graduated opening said valve tube fitted to and in a fixed valve opening, the pressure head has openings to meet the water needs and with sufficient solid face to balance with spring adjusted to hold the low of varied water pressures and giving with increased pressure thereby moving valve tube further into fixed valve opening whereby openings in tube are reduced, the adjustable plate for adjusting to different requirements of more than one sprinkler on the same line.

References Cited
UNITED STATES PATENTS

| | | | |
|---|---|---|---|
| 1,308,613 | 7/1919 | Anderson | 239—561 |
| 1,335,267 | 3/1920 | Ambrose | 239—561 |
| 2,595,114 | 4/1952 | Wieseltier | 239—97 |
| 2,600,987 | 6/1952 | Gallice | 239—97 |
| 2,723,157 | 11/1955 | Thompson | 239—97 |
| 3,095,148 | 6/1963 | Smith | 239—97 |
| 3,104,818 | 9/1963 | Ballard et al. | 239—97 |
| 3,111,268 | 11/1963 | Butler | 239—172 |

EVERETT W. KIRBY, *Primary Examiner.*

U.S. Cl. X.R

239—561, 236